(12) United States Patent
Kawamoto et al.

(10) Patent No.: US 10,981,246 B2
(45) Date of Patent: Apr. 20, 2021

(54) LASER WELDING METHOD

(71) Applicant: Panasonic Intellectual Property Management Co., Ltd., Osaka (JP)

(72) Inventors: Atsuhiro Kawamoto, Hyogo (JP); Junji Fujiwara, Osaka (JP); Yasushi Mukai, Osaka (JP); Hitoshi Nishimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 153 days.

(21) Appl. No.: 16/088,617

(22) PCT Filed: Mar. 28, 2017

(86) PCT No.: PCT/JP2017/012589
§ 371 (c)(1),
(2) Date: Sep. 26, 2018

(87) PCT Pub. No.: WO2017/170517
PCT Pub. Date: Oct. 5, 2017

(65) Prior Publication Data
US 2019/0076962 A1 Mar. 14, 2019

(30) Foreign Application Priority Data

Mar. 30, 2016 (JP) .............................. JP2016-067194
Apr. 12, 2016 (JP) .............................. JP2016-079345

(51) Int. Cl.
*B23K 26/21* (2014.01)
*B29C 65/16* (2006.01)
(Continued)

(52) U.S. Cl.
CPC .............. *B23K 26/21* (2015.10); *B23K 11/30* (2013.01); *B23K 26/22* (2013.01); *B23K 26/244* (2015.10);
(Continued)

(58) Field of Classification Search
CPC .... B23K 26/21; B23K 26/244; B23K 26/323; B23K 26/22; B23K 26/324;
(Continued)

(56) References Cited

U.S. PATENT DOCUMENTS

| 6,291,792 B1* | 9/2001 | Fussnegger | ............ | B23K 11/20 |
| | | | | 219/118 |
| 2014/0054273 A1* | 2/2014 | Behmlander | .......... | B23K 28/02 |
| | | | | 219/121.64 |

(Continued)

FOREIGN PATENT DOCUMENTS

| DE | 10 2007 022 134 | 3/2008 |
| JP | 60-40958 | 9/1985 |

(Continued)

OTHER PUBLICATIONS

International Search Report dated Jun. 20, 2017 in International (PCT) Application No. PCT/JP2017/012589.
(Continued)

*Primary Examiner* — Brian W Jennison
(74) *Attorney, Agent, or Firm* — Wenderoth, Lind & Ponack, L.L.P.

(57) ABSTRACT

A laser welding method according to the present disclosure includes a step in which a third material is interposed between a first material and a second material, which are made of the same type of metal so as to be weldable to one another, and at least one of which is provided with a protruding portion, wherein the third material is difficult to weld to the first material and the second material and has a through-hole portion into which the protruding portion is inserted. The method also includes a step in which, when the third material is interposed between the first material and the second material, a region corresponding to the protruding portion is irradiated with a laser beam from the first material side, and the first material and the second material are (Continued)

welded via the through-hole portion. In the step in which the third material is interposed between the first material and the second material, a first gap is provided between the protruding portion and the inner peripheral face of the through-hole portion, and a second gap corresponding to the plate thickness of the first material is provided between the first material and the second material in the region corresponding to the protruding portion.

7 Claims, 6 Drawing Sheets

(51) Int. Cl.
*B23K 26/324* (2014.01)
*B23K 26/323* (2014.01)
*B23K 26/244* (2014.01)
*B23K 26/22* (2006.01)
*B23K 11/30* (2006.01)
*B23K 103/16* (2006.01)
*B23K 103/22* (2006.01)
*B23K 103/20* (2006.01)

(52) U.S. Cl.
CPC .......... *B23K 26/323* (2015.10); *B23K 26/324* (2013.01); *B29C 65/16* (2013.01); *B23K 2103/172* (2018.08); *B23K 2103/20* (2018.08); *B23K 2103/22* (2018.08)

(58) Field of Classification Search
CPC .......... B23K 2103/20; B23K 2103/172; B23K 2103/22; B23K 11/30
See application file for complete search history.

(56) References Cited

U.S. PATENT DOCUMENTS

2014/0294489 A1  10/2014  Sakai
2016/0123362 A1   5/2016  Iwase

FOREIGN PATENT DOCUMENTS

| JP | 60-54147 | 11/1985 |
| JP | 2000-141029 | 5/2000 |
| JP | 2002-010813 | 1/2002 |
| JP | 2002-336983 | 11/2002 |
| JP | 2008-6465 | 1/2008 |
| JP | 2008-30113 | 2/2008 |
| JP | 2011-173146 | 9/2011 |
| JP | 2014-188548 | 10/2014 |
| JP | 2014-226698 | 12/2014 |
| JP | 2015-42417 | 3/2015 |

OTHER PUBLICATIONS

Extended European Search Report dated Apr. 15, 2019 in European Application No. 17775054.4.
Examination Report dated Nov. 10, 2020 in Indian Patent Application No. 201847038993.

* cited by examiner

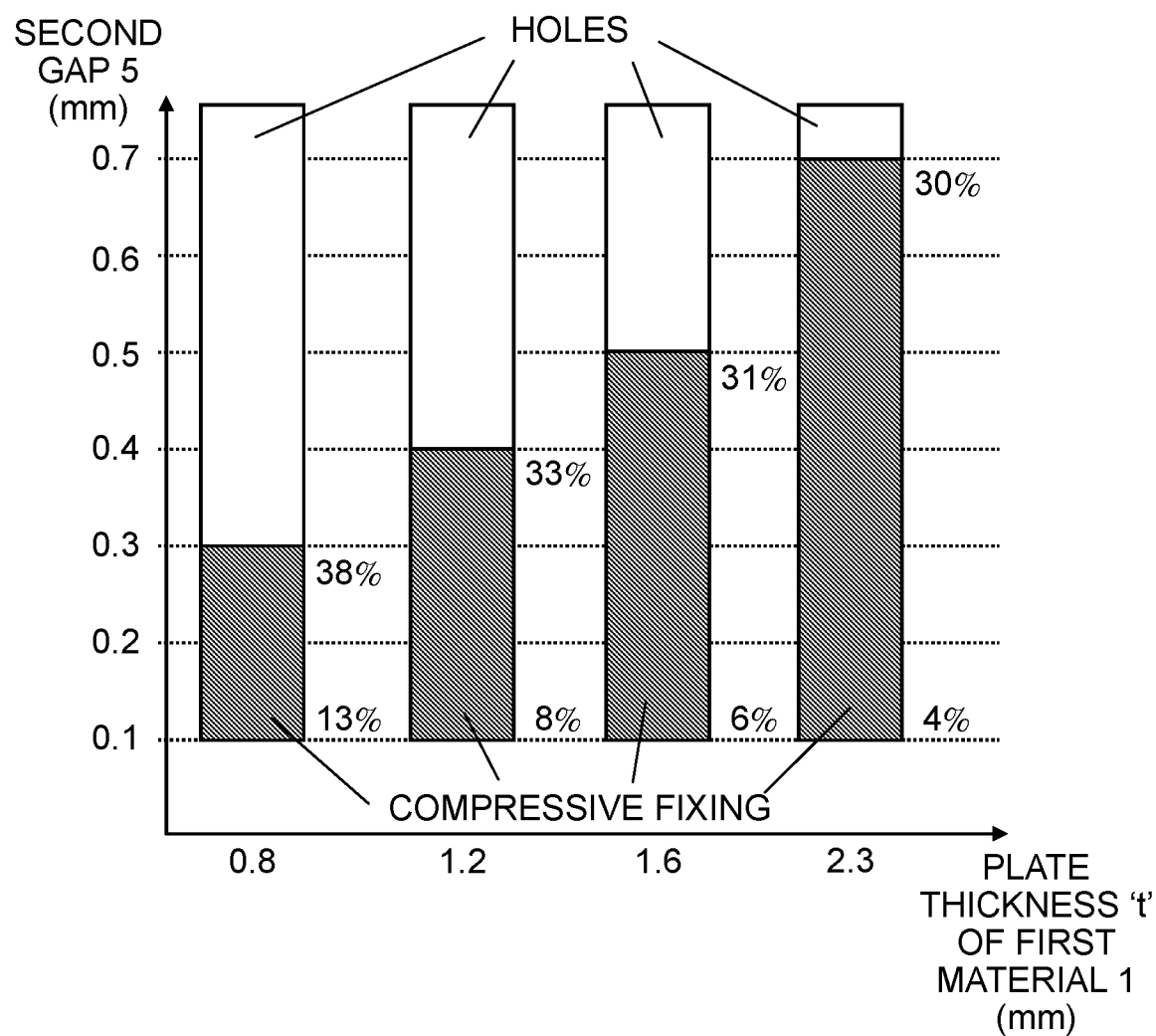

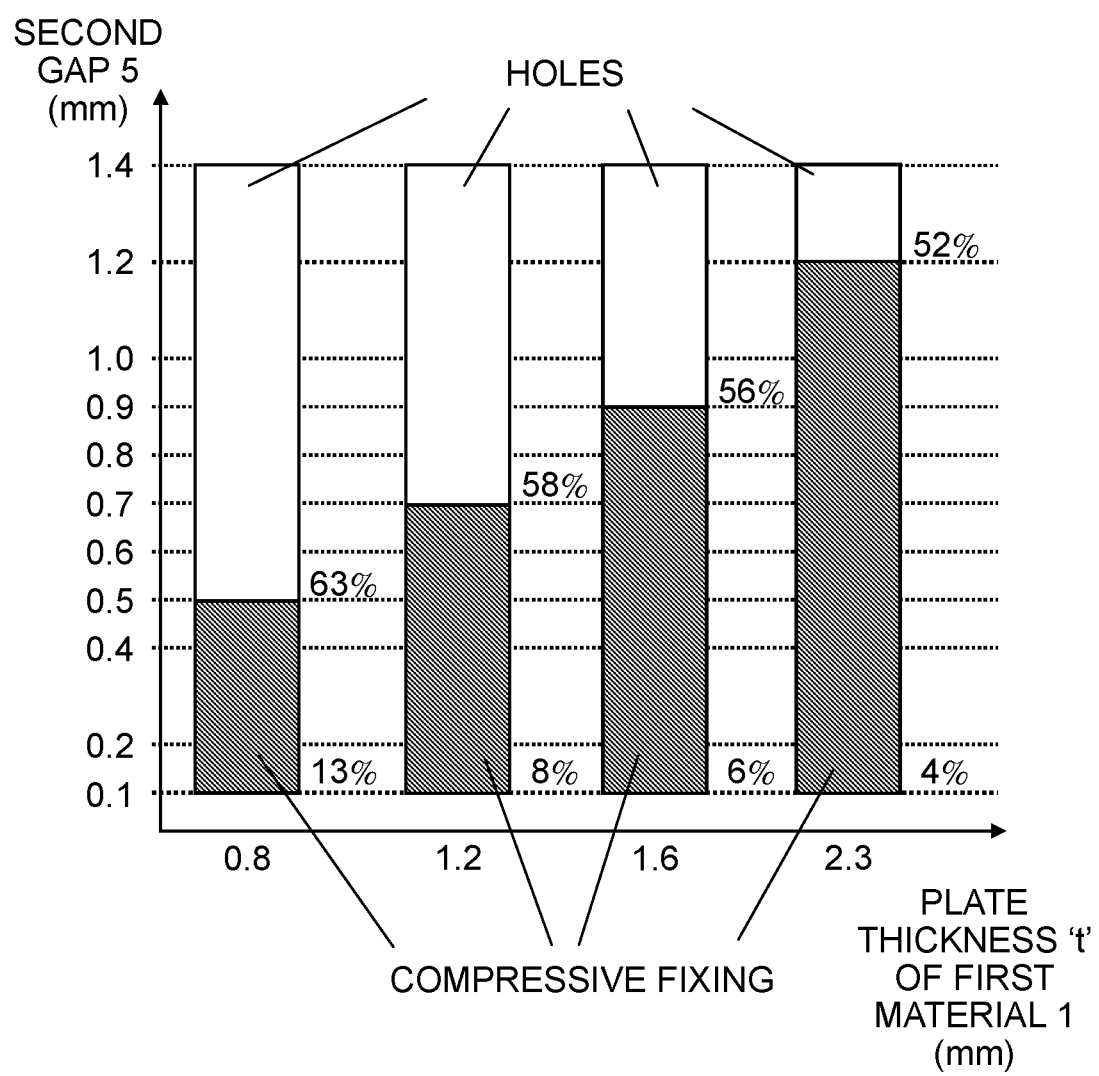

LASER WELDING METHOD

TECHNICAL FIELD

The present disclosure relates to a laser welding method.

BACKGROUND ART

Recent expansion of global transport of automobiles and other products has increased production volume of them. Under such a trend, there has been a growing demand for reduction of a total cost per product; particularly for enhancing production efficiency by decreased production time.

At the same time, there has been a worldwide strong demand for constraint on carbon emissions to prevent global warming. To meet the demand, strenuous efforts on improvement of fuel efficiency are accelerating in transportation business including car industries. Decreasing weight of vehicles is a specific approach to improvement of fuel efficiency. Manufacturers are searching for using lightweight materials as possible.

As a welding method for transportation equipment including cars, a spot welding is widely employed. The spot welding (i.e., a resistance welding) has an upper electrode and a lower electrode as a welding gun for spot welding. Materials to be welded are tightly pressed between the upper electrode and the lower electrode and has application of current between the two electrodes. Therefore, the spot welding is not suitable for one-side welding and has limitations on shapes of material to be welded. Further, the welding gun needs a space on the upper and lower sides of the material to fit itself in and applies pressure to a welding position. This provides a product with limitation in shape. Besides, due to heavy weight of the welding gun itself, the welding gun cannot move fast. After arriving the welding position, the welding gun needs pressure time for welding material prior to welding. After welding, time for cooling the welded material is needed. That is, the spot welding needs lots of time before and after welding.

As for weight saving of materials used for cars, manufacturers try to change a part of components from steel to light-metal material, such as aluminum. In such an effort, a technique and a structure for connecting light-metal material with steel has been needed.

Generally, it is very difficult to connect steel and aluminum that is a different-type material to steel. A spot welding using a rivet and a joining method using adhesives are conventionally used for connecting materials of different type. For example, Patent Literature 1 discloses a rivet shape, caulking, and a spot welding method capable of absorbing plastic flow that not only occurs in application of pressure on a different-type material between a rivet and a joint material similar to the material of the rivet but also occurs in the different-type material caused by welding heat in spot welding. A different-type material often has a partial deformation in caulking and spot welding, and in other cases, such a different-type material sometimes has a depressed portion caused by a positional gap of the electrodes in spot welding. The structure disclosed in Patent Literature 1 addresses the problem above, maintaining joint strength so as not to have degradation.

CITATION LIST

Patent Literature

PTL 1; Japanese Unexamined Patent Application Publication No. 2015-42417

SUMMARY OF THE INVENTION

A conventional joint structure for connecting different-type materials is described with reference to FIG. 7. Different-type joint body 100 is formed of rivet 51, first joint material 200, and second joint material 300. Rivet 51 and second joint material 300 are same-type materials. First joint material 200 is different from the materials of rivet 51 and second joint material 300. Rivet 51 has shaft 52 and head 53. Head 53 has chamfered edge 30 of an R (radius) shape, annular groove 31, and flat part 32. In consideration of a partial deformation of first joint material 200 in caulking and spot welding, a space into which the deformed part moves has to be taken into account in designing a rivet. Further, if first joint material 200 has a depressed part due to, for example, a positional gap of electrode 400 (specifically, the positional gap between axis Z1 of electrode 400 and axis Z2 of rivet 51) in spot welding, joint strength can be degraded. Having chamfered edge 30, annular groove 31, and flat part 32 allows rivet 51 to deal with the problems above; on the other hand, such a complicated shape of rivet 51 needs a precision work, which increases production cost. Besides, rivet 51 and second joint material 300 are connected by spot welding. Spot welding takes long time for applying pressure and current, for cooling, and for moving, which increases the total working time. Besides, in welding, rivet 51 and second joint material 300 need to be held from both sides, which lowers the degree of flexibility in the shape of products. In spot welding, molten metal is solidified into a weld nugget at a welding position. If a rivet disposed too close to an adjacent rivet, the welding current has a branch current, which fails sufficient nugget formation at welding position X in FIG. 7. To obtain desired nugget formation with no branch current, a rivet has to be disposed with at least minimum joining pitch kept from an adjacent rivet. Due to the rivet arrangement with limitation in joining pitch, a conventional structure has often failed in increase in joint stiffness at an intended position.

The present disclosure provides a laser welding method capable of joining different-type materials in laser welding, enhancing productivity.

To address the problems above, a laser welding method according to an embodiment of the present disclosure includes a step of placing a third material between a first material and a second material. The first material and the second material are of metals so as to be weldable to each other, and at least one of which has a protrusion part. The third material is difficult to weld to the first material and the second material and has a through-hole part into which the protrusion part is inserted. The method also includes a step of emitting laser light from the first material side toward a region corresponding to the protrusion part under condition in which the third material is sandwiched between the first material and the second material, so that the first material and the second material are welded via the through-hole part. In the step in which the third material is sandwiched between the first material and the second material, a first gap is disposed between the protrusion part and the inner peripheral face of the through-hole part, and a second gap depending on the plate thickness of the first material in the region corresponding to the protrusion part is disposed between the first material and the second material in the region corresponding to the protrusion part.

Further, as an aspect of the present disclosure, the laser welding method according includes a step of placing a third material between a first material and a second material. The first material and the second material are of metals so as to be weldable to each other. The third material is difficult to weld to the first material and the second material and has a through-hole part.

The laser welding method also includes a step of emitting laser light from the first material side toward a region corresponding the through-hole part under conditions in which the third material is sandwiched between the first material and the second material, so that the first material and the second material are welded via the through-hole part. In the step in which the third material is sandwiched between the first material and the second material, the plate thickness of the first material in the region corresponding to the through-hole part is determined to depending on the plate thickness of the third material, i.e., to depending on a space between the first material and the third material in the region in the plate thickness direction.

As an aspect of the present disclosure, the laser welding method in which a scanning trace of welding has a weaving, a spiral, a circular, or a coiled shape.

The present disclosure provides a laser welding method capable of the followings: joining different-type materials; significantly reducing production takt time; increasing joint stiffness at an intended position; and enhancing the degree of flexibility in design.

BRIEF DESCRIPTION OF DRAWING

FIG. 3 is a graph of a measurement result showing relation of the plate thickness of the first material and a second gap as the space in the plate thickness direction in a welding with a circular welding trace.

FIG. 6 is a graph of measurement result showing relation of the plate thickness of the first material and the second gap in a welding with a spiral welding trace in accordance with the third exemplary embodiment of the present disclosure.

DESCRIPTION OF EMBODIMENT

First Exemplary Embodiment

Figure 1A:
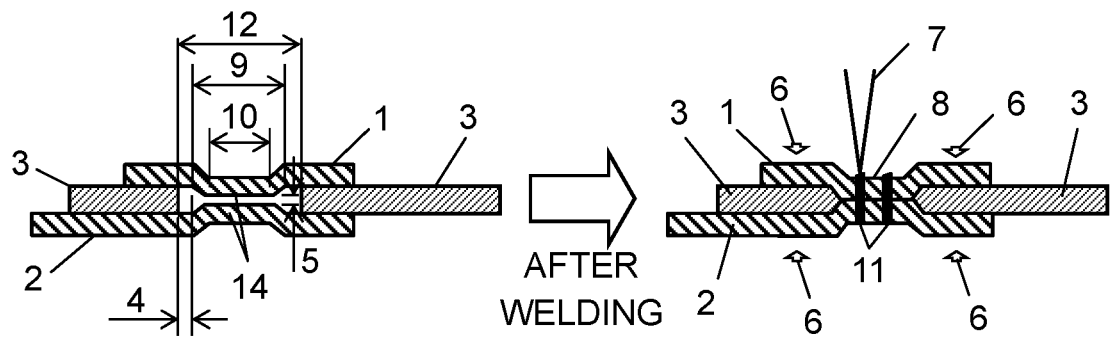
FIG. 1A is a cross section view illustrating a joint structure before and after welding in accordance with a first exemplary embodiment of the present disclosure.
Figure 2A:
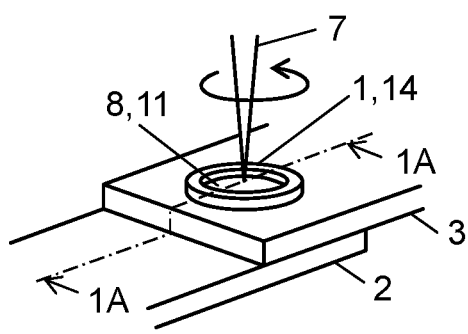
FIG. 2A is a perspective view illustrating a joint state in laser welding in accordance with the first exemplary embodiment of the present disclosure.

The structure of the first exemplary embodiment will be described with reference to FIG. 1A and FIG. 2A. FIG. 1A is a cross section view illustrating a joint state before and after welding in accordance with the first exemplary embodiment of the present disclosure. FIG. 2A is a perspective view illustrating a joint state in laser welding in accordance with the first exemplary embodiment of the present disclosure. FIG. 1A shows the joint structure of first material 1, second material 2, and third material 3. FIG. 1A is a cross section view, taken along line 1A-1A of FIG. 2A.

In the structure above, first material 1 and second material 2 are made of same-type metal so as to be weldable with each other. Third material 3 is made of material different from first material 1 and second material 2 and is difficult to weld to them. As shown in FIG. 1A, in welding, third material 3 of different type is sandwiched between first material 1 and second material 2 of same-type metal. In third material 3, through-hole 12 as a penetrating part is formed in advance. First material 1 and second material 2 have respective protrusion parts 14 that are inserted in through-hole 12 so as to face each other. The structure—in which respective protrusion parts 14 of first material 1 and second material 2 are fitted in through-hole 12 of third material 3—allows through-hole 12 to prevent a relative positional gap between first material 1 and second material 2 with respect to through-hole 12. Further, protrusion part 14 serves as a mark for a welder to see proper positions of laser emission and bead formation.

The structure of the present disclosure has through-hole 12 as an example of the penetrating part, but it is not limited to; the penetrating part may be a penetrating groove.

The materials of same-type metal mean the metals that are weldable with each other. It is not necessarily to be exactly the same; for example, a combination of ferrous metals or a combination of nonferrous metals may be employed, as long as they have a good affinity in welding. For example, the followings are the specific example of a combination of first material 1 and second material 2 in welding: as for ferrous-metal combinations, mild steel and mild steel; mild steel and stainless steel ; stainless steel and stainless steel;

mild steel and high-tensile steel; high-tensile steel and stainless steel; high-tensile steel and high-tensile steel, and as for nonferrous-metal combinations, aluminum and aluminum; aluminum and aluminum alloy; aluminum alloy and aluminum alloy.

Third material 3 of different type, which differs in material from first material 1 and second material 2 of same-type metal, is difficult to be welded to first material 1 and second material 2. For example, when ferrous-metal material is chosen for first material 1 and second material 2 of same-type metal material, non-ferrous metal, such as copper and aluminum, is employed for different-type second material 2. Resin material, such as CFRP (carbon fiber reinforced plastics) and PET (polyethylene terephthalate) is also employed as a material different from the metal material.

In the embodiment, respective protrusion parts 14 of first material 1 and second material 2 are formed into a substantially same shape. As shown in FIG. 1A, first gap 4 is the space between protrusion outside part 9 of oppositely-disposed protrusion parts 14 of first material 1 and second material 2 and the edge section (inner peripheral face) of through-hole 12 of third material 3. First gap 4 is formed in a direction perpendicular to the plate thickness direction. When each protrusion part 14 of first material 1 and second material 2 is inserted into through-hole 12 of third material 3, respective protrusion parts 14 face via a space in the plate thickness direction; the space is second gap 5. In other words, second gap 5 is the space between first material 1 and second material 2 in the plate thickness direction of through-hole 12. Further, in the description, the inside part of protrusion part 14 is defined as protrusion inside part 10, which is the incident effective region of laser 7 (i.e., welding effective range) in welding. The structure of the embodiment, as shown FIG. 1A and FIG. 2A, is welded by laser light (laser 7). Specifically, as shown in FIG. 2A, laser 7 is circularly emitted from the side of first material 1 toward protrusion inside part 10 of protrusion part 14. As shown in FIG. 1A, weld bead 11 (as a part of weld part 8) is formed in protrusion inside part 10. Weld part 8, at which first material 1 and second material 2 are welded, has weld bead 11 as solidified welding metal and a heat-affected part. In the embodiment, as described above, laser 7 is emitted from the side of first material 1 to the incident effective region corresponding to protrusion part 14. In the incident effective region, the space between first material 1 and second material 2 is second gap 5.

Next, the joining state in and after welding is described with reference to FIG. 1A. Weld bead 11 is formed as a result of laser incident circularly applied to protrusion inside part 10 of first material 1. At that time, in weld part 8, molten metal of first material 1 and second material 2 solidifies and shrinks, by which second gap 5 shrinks. In this manner, under the state where second gap 5 exists, the incident effective region undergoes incident of laser 7 in the plate thickness direction. With the incident of laser, first material 1 and second material 2 of same-type metal fuse, solidify, and shrink.

As a result, third material 3 between the same-type materials is fixed with compression force.

When the length of second gap 5 is determined to be 4%-38% of plate thickness 't' of first material 1 on the laser-incident side, solidification and shrinkage of weld part 8 acts as compression force 6 of first material 1 and second material 2 exerted on third material 3, compressively fixing third material 3.

The determination above—determining the length of the gap to be 4%-38% of plate thickness 't' of first material 1—is obtained from experiment data. FIG. 3 shows an example of the data.

FIG. 3 is a graph of a measurement result showing relation of plate thickness 't' of first material 1 and second gap 5 in welding with a circular welding trace.

As a material selection in the experiment, mild steel was employed for first material 1 and second material 2 of same-type metal, and PET as a resin was employed for third material 3 as a different type material. Under the state in which third material 3 was sandwiched between first material 1 and second material 2 (where, first material 1 was disposed upper than second material 2), laser 7 was circularly emitted from above first material 1 in the material-stacked direction (i.e., in the plate thickness direction) to protrusion inside part 10 of first material 1. The output of laser 7 in the experiment was determined to 3 kW.

In the experiment, the diameter of protrusion inside part 10 of first material 1 and second material 2 was determined to 10 mm, and the diameter of through-hole 12 of third material 3 was determined to 12 mm. When laser 7 is emitted to protrusion inside part 10, the laser incident region should be smaller than the diameter or the width of protrusion inside part 10 so as to have a distance from the edge of protrusion inside part 10. In the experiment, the laser incident region was determined to be a circular region with a diameter of 8 mm so as to close to the diameter of protrusion inside part 10 as possible, not in excess of it. However, it is merely an example and it is not limited to the aforementioned value.

Next, the experimental result of FIG. 3 is described below. In the graph of FIG. 3, the horizontal axis represents plate thickness 't' of first material 1 and the vertical axis represents the length of second gap 5. For example, when first material 1 has plate thickness 't' of 0.8 mm, the effective range of the length of second gap 5 to provide third material 3 with preferably compressed fixing (brought by solidification and shrinkage effect of molten metal at weld part 8) is 0.1 mm to 0.3 mm. The length of second gap 5 greater than 0.3 mm caused a partial deficiency in a weld line, such as holes, (At least one opening holes formed in the weld due to insufficient filling of molten during welding.) resulting in poor weld. The experiment shows that, when first material 1 has plate thickness 't' of 0.8 mm, the effective length of second gap 5 is 13%-38% of plate thickness 't' of first material 1.

When first material 1 has plate thickness 't' of 2.3 mm, the effective range of the length of second gap 5 to provide third material 3 with preferably compressed fixing (brought by solidification and shrinkage effect of molten metal at weld part 8) is 0.1 mm to 0.7 mm. The length of second gap 5 greater than 0.7 mm caused a partial deficiency in weld line, such as holes, (At least one opening holes formed in the weld due to insufficient 5 filling of molten metal during welding.) resulting in poor weld. The experiment shows that, when first material 1 has plate thickness 't' of 2.3 mm, the effective length of second gap 5 is 4%-30% of plate thickness 't' of first material 1. That is, with respect to plate thickness 't' of first material 1 disposed on the laser incident side, determining the length of second gap 5 to be in a predetermined range (specifically, 4%-38% of plate thickness 't' of first material 1) leads to successful welding. Determining the length of second gap 5 to be in the aforementioned range allows third material 3 to be compressively fixed by first material 1 and second material 2.

In other words, the experiment result shows that, when plate thickness 't' of first material 1 and the length of second gap 5 satisfy the relation above, molten metal corresponding to 30%-38% of the maximum plate thickness of first material 1 falls into second gap 5, first material 1 and second material 2 are welded without a defective part, such as holes. If the length of second gap 5 becomes greater than 30%-38% of the maximum plate thickness 't' of first material 1, an amount of molten metal necessary for filling up the inside of second gap 5 cannot be obtained, which causes a defective state, such as making holes.

In contrast, when the length of second gap 5 is smaller than 0.1 mm, the space between protrusion parts 14 becomes too small, and first material 1 and second material 2 fuse together. This causes lack of compressing force 6 to be exerted on third material 3.

As described above, insofar as an enough amount of molten metal in welding, i.e., insofar as having no holes, the greater the length of second gap 5, the greater the solidification and shrinkage effect of weld part 8 between protrusion parts 14. The increase in solidification and shrinkage enhances compressing force 6 (as the fixing force by first material 1 and second material 2) that acts on third material 3.

In the description above, laser 7 is emitted from the side of first material 1, but it is not limited to; the similar effect is obtained by laser emission from the side of second material 2. That is, determining the length of second gap 5 to be approximately not less than 4% and not more than 38% of the plate thickness of second material 2 allows first material 1 and second material 2 to be welded by laser emission from the side of second material 2. Besides, third material 3 is compressively fixed between first material 1 and second material 2.

In the embodiment, respective protrusion parts 14 of first material 1 and second material 2 are the same in shape, but they are not necessarily the same. Besides, the example described above has a structure in which laser 7 is emitted from the side of first material 1, but it is not limited to. When the length of second gap 5 between protrusion parts 14 is determined so as to depend on the plate thickness of the same-type metal material disposed on the laser-incident side; specifically, determined so as to be not less than 4% and not more than 38% of the plate thickness of the material on the laser-incident side, second gap 5 is filled with a sufficient amount of molten metal in welding; accordingly, the solidification and shrinkage effect of weld part 8 allows third material 3 between first material 1 and second material 2 to be fixed with compression force.

In the structure of the embodiment, protrusion part 14 is disposed on both of first material 1 and second material 2. However, as long as second gap 5 meets conditions in length, protrusion part 14 may be disposed on any one of first material 1 and second material 2. Further, laser 7 may be emitted from the side of second material 2, unlike the structure in the embodiment where laser 7 is emitted from the side of first material 1.

Besides, in the description, first material 1 and second material 2 are same-type metal materials and mild steel is employed for them, but they are not limited to, as long as they are weldable with each other with sufficient joining strength.

For example, the followings are ferrous-metal combination examples of first material 1 and second material 2 of same-type metal material: mild steel and mild steel; stainless steel and stainless steel; high-tensile steel and high-tensile steel; mild steel and high-tensile steel; and high-tensile steel and stainless steel. As for a nonferrous-metal combination, the followings are employed: aluminum and aluminum; aluminum alloy and aluminum alloy; aluminum and aluminum alloy. The ferrous-metal materials and the nonferrous-metal materials above, are weldable by laser. In contrast, third material 3 of different-type material is a material that is difficult to be processed by laser welding due to poor absorptivity of laser light, such as copper and resin material, or a material having poor affinity in welding connection with first material 1 and second material 2. For example, a specific combination of same-type materials 1,2 and third material 3 is mild steel (as first material 1 and second material 2) and aluminum (as third material 3) and vice versa.

Next, an example in which second gap 5 has increase in length due to increase in plate thickness of third material 3 is described with reference to FIG. 1B. In the description below, a part that overlaps with an already mentioned part will be omitted. When second gap 5 (as a space between first material 1 and second material 2) has increase in length, spacer 13 is disposed in the inside of through-hole 12 of third material 3. Spacer 13 is a material of metal similar to first material 1 and second material 2 and therefore weldable to them. The structure allows second gap 5 to have a relatively decreased length. The plate thickness of spacer 13 is determined such that, when spacer 13 is disposed in through-hole 12, second gap 5 has a length corresponding to be not less than 4% and not more than 38% of the plate thickness of first material 1. The structure offers preferable welding connection. The length of second gap 5 when spacer 13 is disposed in the inside of through-hole 12 means the distance between spacer 13 and first material 1 in the state where spacer 13 is disposed between first material 1 and second material 2.

Spacer 13 disposed between first material 1 and second material 2 is not necessarily additionally-disposed component; it may be formed between first material 1 and second material 2 by using welding materials, such as a filler and a consumable electrode.

In this case, too, the size of second gap 5 is determined to be in a predetermined range (see FIG. 3) suitable for the plate thickness of the material disposed on the laser-incident side (corresponding to plate thickness 't' of first material 1 in FIG. 3), and keyhole laser welding is carried out so as to penetrate second material 2 as the lower plate. In this way, the solidification and shrinkage effect of weld part 8 produces compressing force 6, providing third material 3 with compressive fixing.

If the length of second gap 5 becomes greater than 30%-38% of the maximum value of plate thickness 't' of first material 1 on the laser-incident side, an amount of molten metal necessary for second gap 5 cannot be obtained, which can cause a defective state, such as making holes.

In contrast, when second gap 5 is smaller than 0.1 mm, protrusion parts 14 get too close each other, and first material 1 and second material 2 of same-type metal fuse together. This causes lack of compressing force 6 on different-type third material 3.

In the structure described above, the different-type material is third material 3 only. Hereinafter, an example in which two materials being different from one another will be described. FIG. 1C is a cross section view illustrating the joint structure before and after welding. As shown in FIG. 1C, when two materials being different from one another are connected, they are sandwiched between first material 1 and second material 2 of same-type metal. At that time, the length of second gap 5 is determined to be not less than 4% and not more than 38% of the plate thickness of first material 1. After that, laser welding is carried out by laser emission from the side of first material 1.

In this case, too, the solidification and shrinkage effect of molten metal of first material 1 and second material 2 produces compression force 6, by which third material 3 and fourth material 15 are compressively fixed. For example, suppose that resin material such as PET and nonmetal material such as CFRP are employed for third material 3 and fourth material 15 as different materials from one another. Such a material tends to exhibit high absorptivity of laser light 7 and is difficult to be directly welded with a material of different type. As is the case having one and only material of different type, it is also effective in joining third material 3 and fourth material 15 between first material 1 and second material 2. Specifically, the size of second gap 5, which is a space disposed between protrusion parts 14 in the plate thickness direction, is determined to be in a predetermined range that ensures an amount of molten metal necessary for filling up second gap 5. In laser welding, protrusion parts 14 are fused and bonded; at the same time, solidification and shrinkage effect of weld part 8 produces compression force 6, by which third material 3 and fourth material 15 are compressively fixed between first material 1 and second material 2. In this way, the laser welding method is particularly effective in joining material with compressive fixing. It is also effective in connecting two-or-more kinds of different-type material.

The incident region of protrusion part 14 on which laser 7 is incident along the plate thickness direction is determined to be small with respect to the diameter or width of embossed protrusion part 14. According to the embodiment, the incident region is formed to be a small area at a remove of, for example, approximately 2 mm from protrusion inside part 10 with respect to the diameter or the width of protrusion part 14 pushed out into a tapered shape from first material 1 and second material 2.

With the incident of laser 7, third material 3 receives welding heat input transferred from molten metal at weld part 8. Whether different-type third material 3 has an intended fusion or not greatly depends on the positional relation of protrusion inside part 10, protrusion outside part 9, and through-hole 12 of third material 3.

In the description of the present disclosure, protrusion outside part 9 as the outermost region of protrusion part 14 of first material 1 and/or second material 2 of same-type metal is simply referred to the diameter or the width of protrusion part 14.

When protrusion outside part 9 referred as the diameter or the width of protrusion part 14 (to be inserted in through-hole 12 of third material 3) is properly positioned with respect to through-hole 12, the edge of through-hole 12 fuses by indirect influence of the welding heat input of weld part 8 and fused third material 3 (i.e., the edge of through-hole 12) flows into first gap 4. That is, third material 3 is tightly bonded in a direction perpendicular to the plate thickness direction of the materials, in addition to be compressively fixed by solidification and shrinkage effect of weld part 8.

The incident region of protrusion part 14 to which laser 7 is incident in the plate thickness direction has a dimeter smaller than that of embossed protrusion part 14. The incident region of the structure in the embodiment is smaller, approximately by 2 mm in diameter, than protrusion inside part 10 of protrusion part 14.

With the incident of laser 7, third material 3 receives welding heat input transferred from molten metal at weld part 8. Whether third material 3 has an intended fusion or not greatly depends on the positional relation of protrusion inside part 10, protrusion outside part 9, and through-hole 12. Protrusion part 14 is so formed that first material 1 and second material 2 are pushed out into a tapered shape.

When the distance between protrusion outside part 9 and the edge of through-hole 12 is too small, the edge of through-hole 12 is affected by welding heat input transferred from weld part 8 with incident of laser.

Under the heat effect, fused edge of through-hole 12 of third material 3 flows through first gap 4 into second gap 5. As described above, with incident of laser, molten metal of first material 1 as the upper plate falls into second gap 5. When third material 3 is formed of, for example, a resin having a low boiling point, a vaporized portion of third material 3 can spout out, resulting in poor weld at weld part 8.

In contrast, when the distance between the edge of through-hole 12 gets longer (for example, longer than 2.0 mm for third material 3 of a resin material, and longer than 1.5 mm for third material 3 of CFRP), the edge of through-hole 12 of third material 3 is insusceptible to welding heat input of weld part 8. Having no fusion, third material 3 does not flow into first gap 4. This makes difficult to tightly fix third material 3 to first material 1 and/or second material 2 in a direction perpendicular to the plate thickness direction of third material 3. That is, third material 3 is fixed by only compressive fixing cased by solidification and shrinkage effect of first material 1 and second material 2.

As described above, heat transfer from protrusion outside part 9 to the edge of through-hole 12 and melting condition of heat-affected third material 3 in welding depend on the size of first gap 4 and a material that forms third material 3.

A jig for clamp fixing, a locating pin, or a support position method with a robot arm (not shown) may be used for positioning protrusion part 14 of same-type metal with respect to the diameter of through-hole 12 of different-type material.

Protrusion outside part 9, which is raised up by embossed protrusion part 14, is larger than protrusion inside part 10, and has an emboss shape by press working with an offset amount from approximately 1 mm to a length corresponding to the plate thickness in the circumference direction. In the embodiment, the offset amount is simply described as 1 mm. Although the offset amount should preferably correspond to the plate thickness, it may be 0.6 to 1.4 times the plate thickness, as long as no adverse effect on joining strength in welding.

Figure 4:
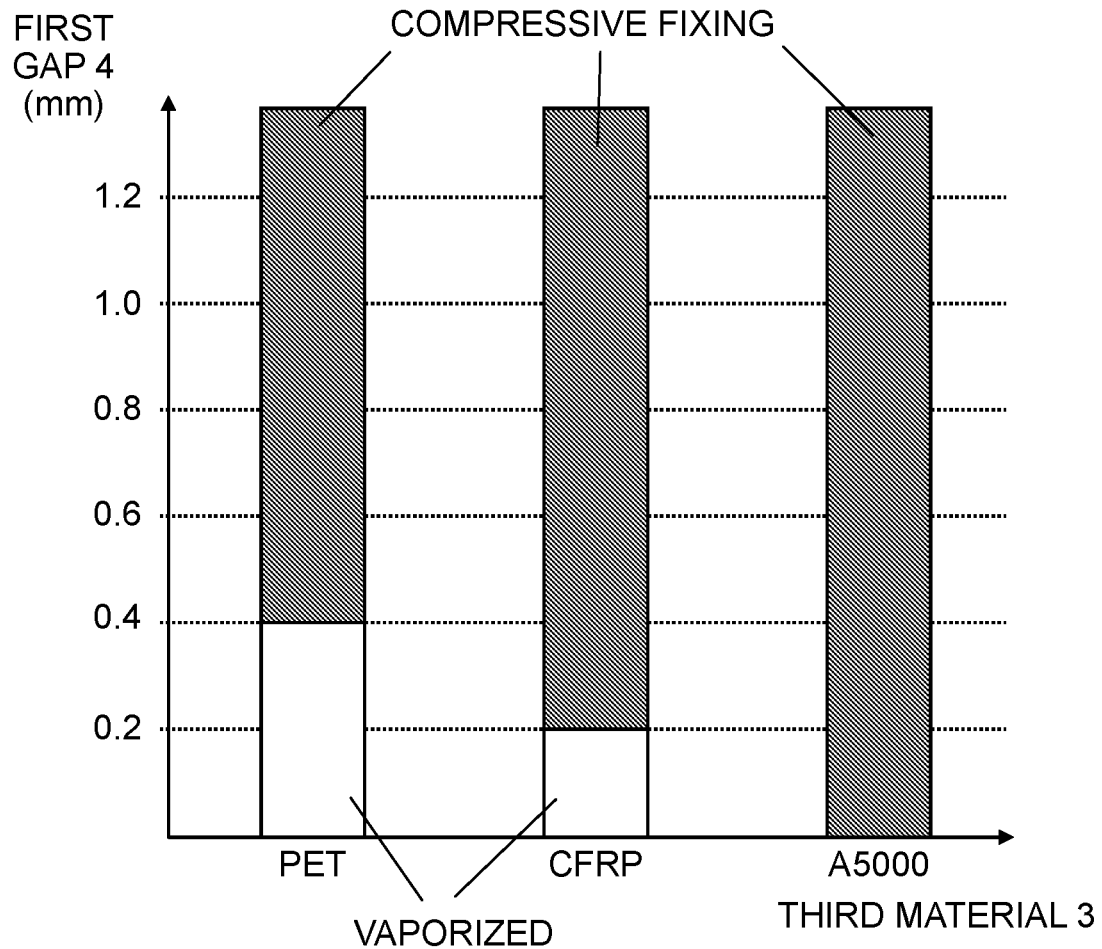
FIG. 4 is a graph of a measurement result showing relation of the material of the third material and a first gap in accordance with the first exemplary embodiment of the present disclosure.

The aforementioned values are obtained from experimental data. FIG. 4 shows an example of the experimental data. FIG. 4 is a graph of measurement results of the relation between the material of third material 3 and first gap 4 in accordance with the second exemplary embodiment of the present disclosure.

In the graph of FIG. 4, the horizontal axis represents a material of third material 3, and the vertical axis represents the size of first gap 4. Specifically, a PET material, a CFRP material, and an A5000 material were employed for third material 3. The A5000 material is an aluminum alloy as a nonferrous-metal material.

In the experiment, a mild-steel material with plate thickness 't' of 1.6 mm was employed for first material 1 and second material 2. As for different-type third material 3, one of the aforementioned three materials with a plate thickness of 2.0 mm was employed. Third material 3 was sandwiched between first material 1 and second material 2. At that time, first material 1 was the upper plate disposed above second material 2. Laser 7 was emitted to protrusion inside part 10 of first material 1 so as to have a circular welding trace. The output of laser 7 was determined to 3 kW. The diameter of protrusion inside part 10 of first material 1 and second material 2 was 10 mm, while the diameter of through-hole 12 of third material 3 was 12 mm. Laser 7 was emitted to protrusion part 14 in the plate thickness direction so as to have a circular trace with a diameter of 8 mm that is smaller than the diameter of protrusion inside part 10.

Next, the measurement result of FIG. 4 is described. As shown in FIG. 4, when third material 3 is a PET material as resin, determining the size of first gap 4 to be 0.4 mm or greater allows third material 3 to be compressively fixed. This is from the reason that, even under the welding heat input effect caused by incident of laser to protrusion inside part 10, second gap 5 has no flow-in of melted third material 3 and thus has no poor weld.

However, when first gap 4 is determined to be smaller than 0.4 mm, i.e., when protrusion outside part 9 is too close to the edge of through-hole 12, weld part 8 often has poor weld. That is, third material 3 fuses by receiving the influence of welding heat input and flows into second gap 5, by which melted and vaporized PET material as third material 3 can spout from the space, resulting in poor weld.

When third material 3 is a CFRP material as resin, determining the size of first gap 4 to be 0.2 mm or greater allows third material 3 to be compressively fixed by compression force 6 in the plate thickness direction.

This is from the reason that, even under the welding heat input effect caused by incident of laser to protrusion inside part 10, second gap has no flow-in of melted third material 3 and thus has no poor weld.

However, when first gap 4 is determined to be smaller than 0.2 mm, i.e., when protrusion outside part 9 is too close to the edge of through-hole 12, weld part 8 often has poor weld. That is, third material 3 fuses by receiving the influence of welding heat input and flows into second gap 5, by which melted and vaporized CFRP material as third material 3 can spout from the space, resulting in poor weld. As shown by the measurement result, when a resin material is employed for third material 3, the properties of the resin material, such as a boiling point and a melting point, somewhat affect the allowable size of first gap 4 in welding.

When A5000 aluminum alloy as nonferrous-metal material is employed for third material 3, stable compressive fixing is expected with no regard to the size of first gap 4. Even under the welding heat input effect caused by incident of laser to protrusion inside part 10, second gap 5 has no flow-in of melted third material 3 and thus has stable compressive fixing.

First gap 4 should be formed so as to have a size enough for protrusion outside part 9 to be inserted in through-hole 12.

The experiment data described above shows an example when the aforementioned different materials were employed for third material 3. The allowable size of second gap 5 obtained in the case of the PET material shown in FIG. 4 tends to be similar to other resin materials. Similarly, the allowable size of second gap 5 obtained in the case of the A5000-series aluminum alloy shown in FIG. 4 tends to be similar to other nonferrous metal. This is because that, even under the welding heat input effect caused by incident of laser to protrusion inside part 10, third material 3 of a nonferrous-metal material is unsusceptible to the heat effect, protecting weld part 8 from poor weld caused by spout-out of an evaporated portion of the material on the inner-wall side of through-hole 12. This is also almost true for other nonferrous metal.

As described above, third material 3 of a nonferrous-metal material is unlikely to have a serious heat impact to such an extent that melted third material 3 flows into second gap 5 as a space between respective protrusion parts 14 of first material 1 and second material 2.

Figure 2B:
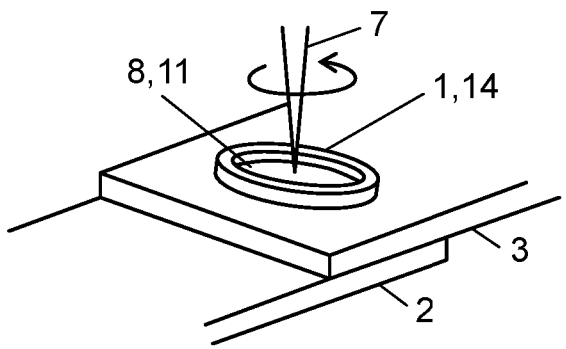
FIG. 2B is a perspective view illustrating a joint state in laser welding in accordance with the first exemplary embodiment of the present disclosure.
Figure 2C:
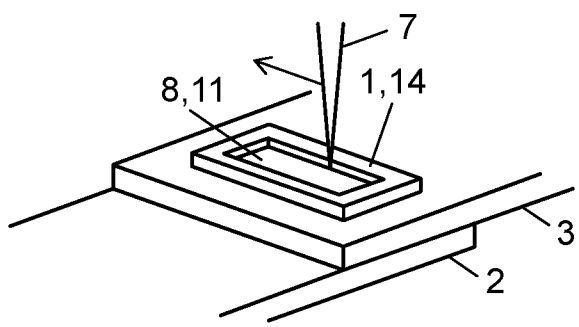
FIG. 2C is a perspective view illustrating a joint state in laser welding in accordance with the first exemplary embodiment of the present disclosure.

FIG. 2A shows an example of weld form having a circular shape, FIG. 2B and FIG. 2C show examples of weld form having other shapes. FIG. 2B and FIG. 2C show a perspective view illustrating a joining state in laser welding according to the first embodiment of the present disclosure. In the joint structure of the same-type metal materials (first material 1 and second material 2) and a different-type material (third material 3) shown in FIG. 2B, first material 1 as the upper plate in the plate thickness direction has a weld form of an oval shape. FIG. 2C shows first material 1 having a weld form of a linear shape. In a case where the weld strength that weld part 8 needs in welding with emission of laser light 7 particularly acts in a certain direction, i.e., when weld part 8 needs weld strength with a certain distribution in joining strength, first material 1 should be disposed along the direction that needs higher strength. For example, when a weld form of an oval shape is employed for the joint section of protrusion part 14, locating the major axis of the oval shape along the direction that needs higher strength reduces the area of the scanning trace of laser 7, compared to a weld form of a large circular shape.

FIG. 2C shows a linear scanning trace of laser emission. Compared to the case in which welding having a scanning trace of a circular or an oval shape is carried out repeatedly for several times, such a linear scanning trace of FIG. 2C decreases the time for welding.

Figure 5A:
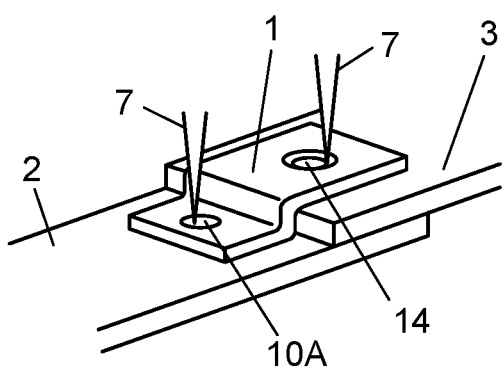
FIG. 5A shows an example of use in accordance with the first exemplary embodiment of the present disclosure.
Figure 5B:
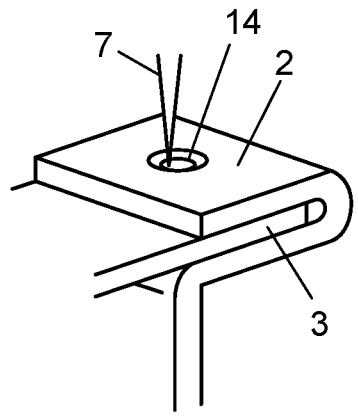
FIG. 5B illustrates an example of the joint structure in accordance with the first exemplary embodiment of the present disclosure.
Figure 7:
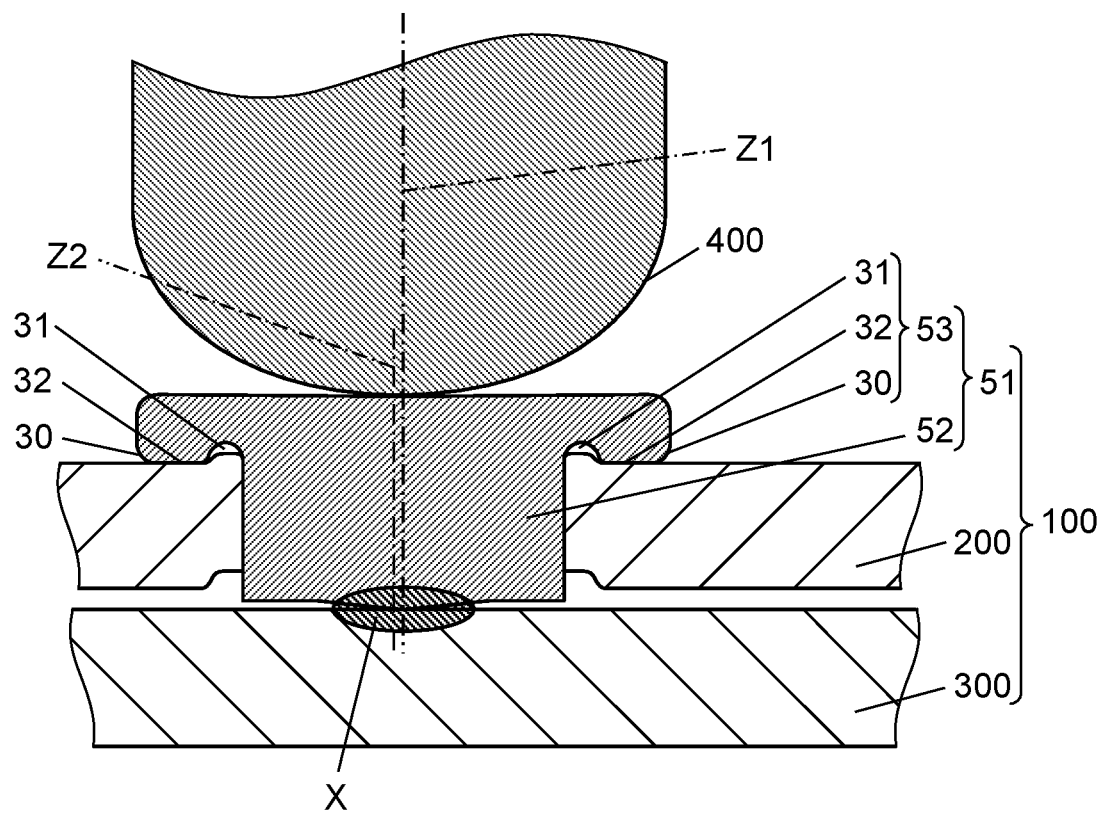
FIG. 7 illustrates a conventional joint structure for connecting different-type materials.

FIG. 5A and FIG. 5B show an example for enhancing welding strength and for making positioning easy. FIG. 5A and FIG. 5B show an example of use according to the first exemplary embodiment of the present disclosure. The joint structure of FIG. 5A enhances tensile strength of the joint section.

Specifically, third material 3 is sandwiched between first material 1 having a stepped portion and second material 2. In the structure, first material 1 works not only for determining the joining position of second material 2 and third material 3 but also enhancing tensile strength. As shown in FIG. 5A, first material 1 is connected to second material 2 at two positions. That is, first material 1 is connected to second material 2 via third material 3 at the position having through-hole 14. Besides, first material 1 is connected with second material 2 at position 10A. The structure prevents weld part 8 from concentration of the stress when third material 3 undergoes tensile force from second material 2 or torsion from outside, enhancing joining strength.

In the structure shown in FIG. 5B, second material 2 contains protrusion part 14 of first material 1. With no use of first material 1, third material 3 is connected to second material 2 by folding back second material 2. The structure eliminates a jig for fixing second material 2. When protrusion part 14 is formed in at least any one of first material 1 and second material 2, third material 3 can be easily set by sliding from the side and through-hole 12 of third material 3 is easily set in place.

In FIG. 5B, the upper-plate section of second material 2 with a folding-back structure corresponds to first material 1 of the present disclosure. That is, first material 1 and second material 2 in the embodiment may be a one-piece structure before welding.

Second Exemplary Embodiment

Next, the structure of the second exemplary embodiment is described with reference to FIG. 1D and FIG. 2A. In the description below, a part that overlaps with the already described part in the first exemplary embodiment will be omitted. As shown in FIG. 1D, third material 3 has through-hole 12, while first material 1 and second material 2 have no embossed protrusion part 14 to be inserted in through-hole 12 of third material 3. Therefore, the plate thickness of third material 3 corresponds to the length of a gap between first material 1 and second material 2 in the plate thickness direction. That is, according to the embodiment, the plate thickness of third material 3 is the length of second gap 5.

In welding, as shown in FIG. 2A, laser 7 is emitted from the side of first material 1 to the incident region corresponding to through-hole 12, by which weld bead is formed as weld part 8 shown in FIG. 1D. Next, a joining state in and after welding is described with reference to FIG. 1D. Laser 7 is emitted from the side of first material 1 to the incident region corresponding to through-hole 12 of third material 3 so as to have a circular welding trace. When weld part 8 is formed in welding, weld part 8 (molten metal) of first material 1 solidifies and shrinks, accordingly, second gap 5 shrinks. When the length of second gap 5 (corresponding to the plate thickness of third material 3) is determined to be not less than 4% and not more than 38% (see FIG. 3) of plate thickness 't' of first material 1 as the upper plate, solidification and shrinkage effect of weld part 8 produces compression force 6 of first material 1 and second material 2 that fixes third material 3.

By virtue of compression force 6, third material 3 is compressively fixed between first material 1 and second material 2. The length setting of second gap 5 (i.e., not less than 6% and not more than 38% of the plate thickness of first material 1) is obtained by experimental results (not shown) of an experiment similar to that described in the first exemplary embodiment. When the size of second gap 5 is determined to be in the effective range above, an amount of molten metal that corresponds to 30%-38% of the maximum value of plate thickness 't' of first material 1 falls into the inner side off through-hole 12. This means successful welding with no defectiveness, such as making holes. However, when the length setting of second gap 5 is beyond the effective range above, an amount of molten metal necessary for filling up the inside of through-hole 12 cannot be obtained, which causes a defective state, such as making holes.

In contrast, when second gap 5 as a space in the plate thickness direction is smaller than 0.1 mm, first material 1 is too close to second material 2, and the same-type metal materials fuse together. This causes lack of compressing force 6 on third material 3 as a different-type material.

Third Exemplary Embodiment

Next, the structure of the third exemplary embodiment is described with reference to FIG. 1B, FIG. 2D, and FIG. 2E.

Figure 1B:
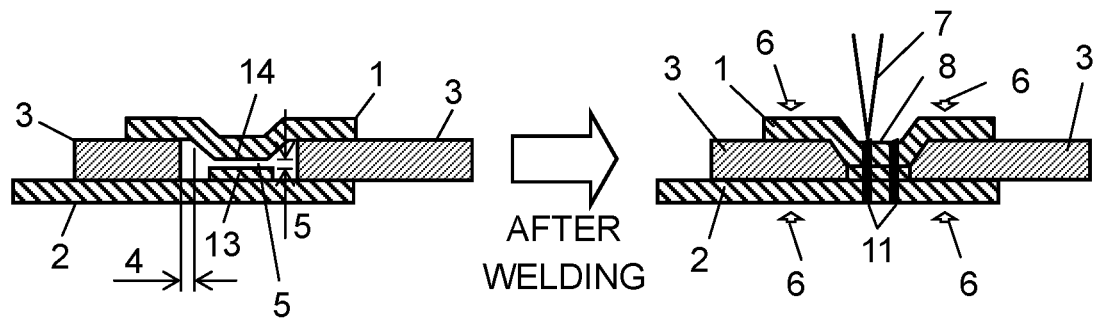
FIG. 1B is a cross section view illustrating a joint structure before and after welding in accordance with the first exemplary embodiment of the present disclosure.
Figure 1C:
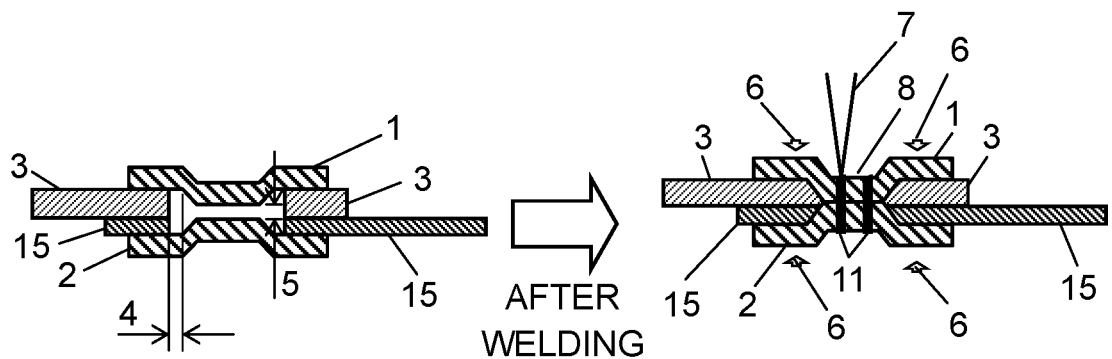
FIG. 1C is a cross section view illustrating a joint structure before and after welding in accordance with the first exemplary embodiment of the present disclosure.
Figure 1D:
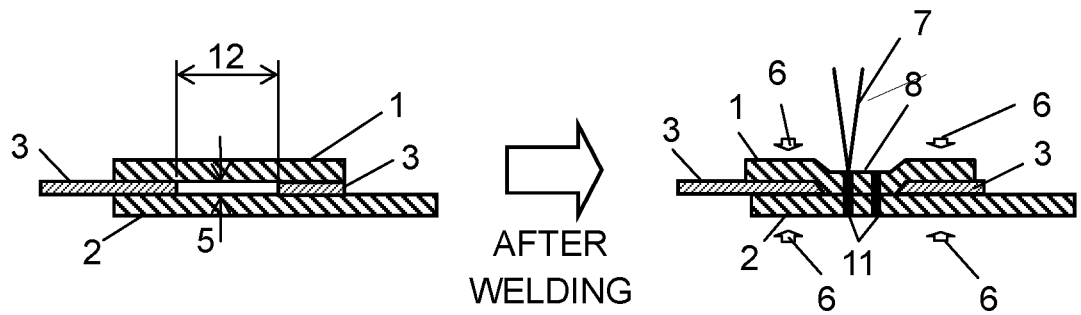
FIG. 1D is a cross section view illustrating a joint structure before and after welding in accordance with a second exemplary embodiment of the present disclosure.

In the description of first exemplary embodiment, when second gap 5 is large in size, spacer 13 shown in FIG. 1B is inserted into through-hole 12. However, the laser welding method of the third exemplary embodiment offers good weld with no need for using spacer 13 even when second gap 5 has increase in size.

Figure 2D:
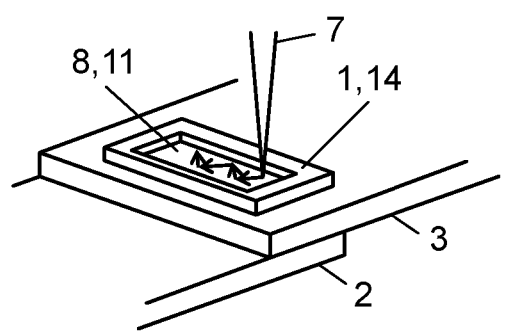
FIG. 2D is a perspective view illustrating a joint state in laser welding in accordance with a third exemplary embodiment of the present disclosure.
Figure 2E:
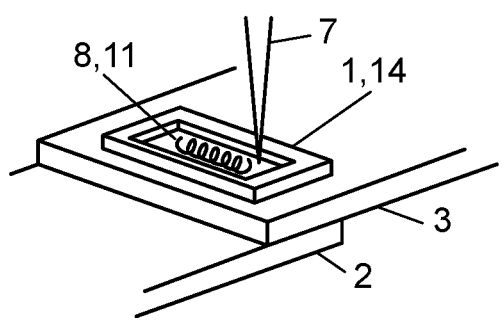
FIG. 2E is a perspective view illustrating a joint state in laser welding in accordance with the third exemplary embodiment of the present disclosure.

FIG. 2D and FIG. 2E show a perspective view illustrating a joint state in laser welding in accordance with the third exemplary embodiment of the present disclosure. FIG. 2D shows a weaving trace of laser emission and FIG. 2E shows a spiral trace of laser emission. As shown in FIG. 2E and FIG. 2D, laser emission with a weaving or a spiral trace allows weld bead to have an increased bead width, increasing an amount of molten metal. In this way, a sufficient amount of molten metal falls into through-hole 12, contributing to good weld without making holes.

For example, changing the welding trace of laser emission from a circular shape to a spiral shape widens the effective range of compressive fixing of plate thickness 't' of first material 1 with respect to the size of second gap 5; according to experimental data, from 'not less than 4% and not more than 38%' to 'not less than 4% and not more than 63%'). FIG. 6 shows an example of the experimental data in welding with spiral welding trace. The experiment of FIG. 6 differs from the experiment of FIG. 3 in increasing laser output to 3.5 kW. This is because welding heat input disperses due to the spiral trace of welding.

FIG. 6 is a graph of measurement result showing relation of plate thickness 't' of first material 1 and second gap 5 in a welding with a spiral welding trace in accordance with the third exemplary embodiment of the present disclosure. In the graph of FIG. 6, the horizontal axis represents plate thickness 't' of first material 1 and the vertical axis represents the length of second gap 5.

For example, when first material 1 has plate thickness 't' of 0.8 mm, the effective range of the length of second gap 5 to provide third material 3 with preferably compressed fixing (brought by solidification and shrinkage effect of molten metal at weld part 8) is 0.1 mm to 0.5 mm. The length of second gap 5 greater than 0.5 mm caused a partial deficiency in weld line, such as holes, resulting in poor weld. The experiment shows that, when first material 1 has plate thickness 't' of 0.8 mm, the size of second gap 5 to obtain the effective range of compressive fixing is not less than 13% and not more than 63% of plate thickness 't' of first material 1. When first material 1 has plate thickness 't' of 2.3 mm, the effective range of the length of second gap 5 to provide third material 3 with preferably compressed fixing (brought by solidification and shrinkage effect of molten metal at weld part 8) is 0.1 mm to 1.2 mm. The length of second gap 5 greater than 1.2 mm caused a partial deficiency in weld line, such as holes, resulting in poor weld. As shown in the graph, when first material 1 has plate thickness 't' of 2.3 mm, the size of second gap 5 to obtain the effective range of compressive fixing is not less than 4% and not more than 52% of plate thickness 't' of first material 1.

When the size of second gap 5 is determined to be in the effective range above, an amount of molten metal that corresponds to not more than 52% of plate thickness 't' of first material 1 falls into second gap 5. This means successful welding with no defectiveness, such as making holes. However, when the length of second gap 5 is greater than 52% of plate thickness 't' of first material 1, a sufficient amount of molten metal for filling up the inside of through-hole 12 cannot be obtained, which causes a defective state, such as making holes.

As described above, a weaving trace and a spiral trace of laser emission widen the effective range. In addition to the traces above, a coiled shape scanning from the center toward outside (or from outside toward the center) is also effective in widening the effective range.

Conventionally, a different-type material often has a partial deformation in caulking and spot welding, and in other cases, such a different-type material sometimes has a depressed portion caused by a positional gap of the electrodes in spot welding. To deal with the problems above and prevent fastening force from degradation, rivet 51 as a member for joining a different-type material has to have a complicated shape with high precision, such as chamfered edge 30 of an R (radius) shape, annular groove 31. That is, rivet 51 has to have a precision work, which increases production cost.

Further, the spot welding takes long time for applying pressure and current, for cooling, and for moving before/after welding, which prolongs the total working time and lowers productivity. Besides, joining materials are welded while being held from the both sides, which lowers the degree of flexibility in design of joining materials. In the resistance welding, molten metal is solidified into a weld nugget at a welding position. If a rivet disposed too close to an adjacent rivet, the welding current has a branch current, which fails sufficient nugget formation at an intended welding position. To obtain desired nugget formation with no branch current, a rivet has to be disposed with at least minimum joining pitch kept from an adjacent rivet. Due to the rivet arrangement with limitation in joining pitch, a conventional structure has often failed in increase in joint stiffness at an intended position. The structure of the present disclosure addresses the conventional problems.

As described in the embodiments above, the laser welding method according to the present disclosure includes a step of placing third material 3 between first material 1 and second material 2. First material 1 and second material 2 are of metals so as to be weldable to each other, and at least one of which has protrusion part 14. Third material 3 is difficult to weld to first material 1 and second material 2 and has a through-hole part into which protrusion part 14 is inserted. The method further includes a step of emitting laser light from the first material side toward a region corresponding to the protrusion part under condition in which third material 3 is sandwiched between first material 1 and second material 2, so that first material 1 and second material 2 are welded via the through-hole part. In the step in which third material 3 is sandwiched between first material 1 and second material 2, first gap 4 is disposed between protrusion part 14 and the inner peripheral face of the through-hole part, and second gap 5 depending on the plate thickness of first material 1 in the region corresponding to the protrusion part is disposed between first material 1 and second material 2 in the region corresponding to protrusion part 14. With the structure above, the laser welding method connects a different-type material to same-type metal materials such that the different-type material is compressively fixed between the fused and bonded same-type metal materials. Using the method eliminates a complicated component that needs a precision work.

According to the laser welding method of the present disclosure, determining each size of first gap 4 and second gap 5 to be in a predetermined range allows first material 1 and second material 2 to be fused and bonded, by which third material 3 is compressively fixed therebetween by laser welding only.

Further, the method uses laser welding, not spot welding. It decreases the total working time including an actual welding time to approximately 25% of the time needed for spot welding, remarkably enhancing productivity. Besides, using the method enhances joint stiffness at an intended position and increases degree of flexibility in design of joining materials.

INDUSTRIAL APPLICABILITY

The joint structure of the present disclosure is suitable for connecting different-type materials. Having a simple structure, the joint structure significantly decreases production takt time and increases stiffness at a position that needs it. Further, the structure allows joining material to have increased flexibility in design. As described above, the structure has high industrial applicability as a joint structure for laser welding.

REFERENCE MARKS IN THE DRAWINGS 1 first material
2 second material
3 third material
4 first gap
5 second gap
6 compression force
7 laser
8 weld part
9 protrusion outside part
10 protrusion inside part
11 weld bead
12 through-hole
13 spacer
14 protrusion part
15 fourth material

The invention claimed is:

1. A laser welding method comprising:
placing a third material between a first material and a second material that are made of metals so as to be weldable to each other,
wherein at least one of the first material and the second material has a protrusion part, the third material is different from the first material and the second material, the third material is difficult to weld to the first material and the second material, and the third material has a penetrating part into which the protrusion part is inserted,
wherein in the placing the third material between the first material and the second material, (i) a first gap is formed between the protrusion part and an inner peripheral face of the penetrating part, and (ii) in a region corresponding to the protrusion part, a second gap is formed between the first material and the second material, the second gap is formed to be not less than 4% and not more than 38% of a plate thickness of the first material on a laser-incident side, and
wherein the laser welding method further comprises, after the placing the third material between the first material and the second material and in a state in which the second gap is formed between the first material and the second material, emitting laser light from a side on which the first material is disposed toward the region corresponding to the protrusion part, so that the first material and the second material are fused and bonded together via the penetrating part, by which the third material is compressed between the first material and the second material and is fixed to the first material and the second material.

2. The laser welding method according to claim 1, wherein the second gap is formed such that a spacer or welding material is disposed between the first material and the second material.

3. The laser welding method according to claim 1, wherein, with emission of laser light to the region corresponding to the protrusion part, an edge of the penetrating part of the third material fuses by indirect influence of welding heat input and flows into the first gap, by which a tightly fixed connection between the third material and the first material and/or the second material is further obtained in a direction perpendicular to a plate thickness direction of the first material.

4. The laser welding method according to claim 1, wherein a scanning trace of welding has a weaving, a spiral, a circular, or a coiled shape.

5. A laser welding method comprising:
placing a third material between a first material and a second material that are made of metals so as to be weldable to each other, wherein the third material is different from the first material and the second material, the third material is difficult to weld to the first material and the second material, and the third material has a penetrating part, wherein in the placing the third material between the first material and the second material, a gap is formed between the first material and the second material in a region corresponding to the penetrating part, the gap is formed to be not less than 4% and not more than 38% of a plate thickness of the first material on a laser-incident side, and wherein the laser welding method further comprises, after the placing the third material between the first material and the second material and in a state in which the gap is formed between the first material and the second material, emitting laser light from a side on which the first material is disposed toward the region corresponding to the penetrating part, so that the first material and the second material are fused and bonded together via the penetrating part, by which the third material is compressed between the first material and the second material and is fixed to the first material and the second material.

6. The laser welding method according to claim 5, wherein the gap is formed such that a spacer or welding material is disposed between the first material and the second material.

7. The laser welding method according to claim 5, wherein a scanning trace of welding has a weaving, a spiral, a circular, or a coiled shape.

* * * * *